(12) United States Patent
Spencer et al.

(10) Patent No.: US 7,464,873 B2
(45) Date of Patent: Dec. 16, 2008

(54) METHOD OF MANAGING EXPIRATION DATED PRODUCT INVENTORIES

(75) Inventors: Terry L. Spencer, 9675 Noonday Rd., Hallsville, TX (US) 75650; Glen H. Hobbs, Longview, TX (US)

(73) Assignee: Terry L. Spencer, Hallsville, TX (US)

( * ) Notice: Subject to any disclaimer, the term of this patent is extended or adjusted under 35 U.S.C. 154(b) by 435 days.

(21) Appl. No.: 11/399,221

(22) Filed: Apr. 6, 2006

(65) Prior Publication Data

US 2007/0235528 A1   Oct. 11, 2007

(51) Int. Cl.
   *G06F 19/00*   (2006.01)
(52) U.S. Cl. .......................... 235/385; 705/22; 705/28; 235/383
(58) Field of Classification Search ............... 235/383, 235/385; 705/22, 28
   See application file for complete search history.

(56) References Cited

U.S. PATENT DOCUMENTS

| | | | |
|---|---|---|---|
| 5,487,276 A | 1/1996 | Namisniak et al. | |
| 6,298,331 B1 | 10/2001 | Walker et al. | |
| 6,327,576 B1 | 12/2001 | Ogasawara | |
| 6,397,226 B1 | 5/2002 | Sage | |
| 6,622,127 B1 | 9/2003 | Klots et al. | |
| 6,681,990 B2 | 1/2004 | Vogler et al. | |
| 6,826,119 B2 | 11/2004 | Fortune | |

*Primary Examiner*—Jamara A Franklin
(74) *Attorney, Agent, or Firm*—Ronald B. Sefma

(57) ABSTRACT

A method of managing inventories of expiration dated products, utilizing a portable programmable electronic code reading device with a keypad for inputting data, a display for displaying data, memory, and data storage, includes the steps of reading a product identification code for a set of product units with the same identification code and same expiration date, entering the expiration date into the device, associating the product identification with the expiration date and storing the associated information in a database, and stocking the product units in inventory. A date is entered into the device to initiate a query of the database for product expiration dates within a preselected range of days from the entered date, generating a sequential listing of product identification and associated expiration dates within the preselected range, enabling a user to check inventory for the presence or absence of product units with the displayed expiration date or dates.

20 Claims, No Drawings

METHOD OF MANAGING EXPIRATION DATED PRODUCT INVENTORIES

FIELD OF THE INVENTION

The present invention generally relates to date tracking systems, and in its preferred embodiments more specifically relates to a method of tracking expiration dates of perishable and other date sensitive inventory items for inventory management and control.

BACKGROUND

Many products, including but not limited to food products, have a limited shelf-life, and an important aspect of the management of inventory that includes such products involves some form of monitoring of the expiration dates so that products can be sold before the expiration date or removed from inventory if the expiration date has passed. Typically, such products are marked with an expiration date printed or stamped on the product package in a form, such as text, that enables a potential purchaser to read the date. Basic information about these products is associated with the packaging in the form of UPC bar codes or, increasingly, RFID tags, that can be scanned for various purposes including basic inventory management and control. The UPC or other identifying code for a particular product is unique to that product. However, because the expiration date for distinct items of a particular product type depend upon the date of production of each unit, expiration dates are constantly changing and are not unique. Further, because expiration dates must be directly readable by potential purchasers, it is not feasible for the manufacturer or producer to encode the expiration date on the package in machine readable form.

In, e.g., a grocery store or supermarket, product codes are scanned when the products are brought into the store or placed on the shelves for sale. The information is provided to a computer system and the products are added to inventory. When a product is sold the product code is scanned at the point of sale the sold product unit is deduced from inventory. These systems are very effective on a gross or basic level, but they neither capture nor track information related to expiration dates because that information is not and cannot feasibly be provided in machine readable form.

Expiration dates must, within the scope of the prior art in this field, be monitored by direct human involvement. In a typical procedure, a person patrols the product shelves, identifies products with expiration dates, and reads the expiration date on each product unit to determine which product units are approaching or have passed their expiration dates. Product units that have passed their expiration dates are typically pulled from the shelves. Procedures for management of product units that are approaching their expiration dates vary, and may include moving the items to a location for quick sale, rearranging product units on the shelf to encourage purchase of oldest items first, or both. This process is time consuming and is subject to error. It is also very inefficient, because it requires all products with expiration dates to be checked, even if none of the units of a particular product are approaching their expiration dates. The accuracy and effectiveness of the expiration date management process is dependant upon the initiative and attention of the person or persons performing the work. The number of product units lost because they have passed their expiration dates can be substantial, and these losses can have a significant economic impact.

There is a need in the grocery industry and in other industries in which monitoring of expiration dates is necessary, for an efficient and accurate method of tracking product expiration dates to improve inventory management and assure that perishable packaged products can be sold before their expiration dates.

SUMMARY OF THE INVENTION

The present invention provides a method of capturing expiration date information for perishable packaged products, capturing machine readable product code information for those products, associating the expiration date information with the product identification information in a database, and generating reports of associated expiration date and product identification information.

In the preferred embodiment the method of the invention is implemented by computer software installed on one or more hand held scanning devices of the type commonly used for reading UPC product information barcodes or reading RFID product information code tags for conventional inventory management systems. When the product code information is entered into the device a query is generated by the software requesting the entry of expiration date information for the product units scanned. That information is entered manually through a keypad on the device or, alternatively, through a voice recognition module of the software. The expiration date information is associated with the product identification information and stored for later processing and retrieval. The data stored in the device may be retained in that device or may be uploaded to a central system, if desired.

A user may retrieve associated expiration date and product identification information in several ways, such as a listing of products with product units with an expiration date equal to a selected input date, a listing of products with product units that will expire within a selected time frame. A user may also enter product identification information in order to determine the expiration date or dates for units of that product. Expiration date information can be deleted when product units with a particular expiration date have been sold, and updated as product units with new expiration dates are stocked for sale.

The method of the invention provides a very efficient system for inventory management and control based on product expiration dates and enables a user to much more effectively manage perishable inventory in less time and with greater accuracy than has been possible with approaches known in the prior art.

Preferred and alternative embodiments of the method of the invention and the features of the method will be described in detail below.

DETAILED DESCRIPTION OF THE INVENTION

The preferred embodiment of the method of the invention is designed for use in conjunction with hand held barcode scanner devices that are commonly used in grocery stores, supermarkets, and the like. Such scanner devices include a barcode scanner, electronic circuitry, internal memory (both volatile and non-volatile), a keypad for manual entry of numerical or alpha-numerical characters, an output screen, and a battery pack. Such devices are essentially hand held special purpose computers capable of retaining data in memory and executing software programs.

In the context of the following description, the device referred to has been prepared with basic operating software and includes in stored memory a database of product descriptions and associated identification codes for stocked products, so that when a UPC product code is scanned with the device a product description can be displayed. Software for performing operations associated with the steps of the method is installed on the device. It is preferred, but not essential to the method of the invention that the device be dedicated to management of products with expiration dates, and that the database includes product identification information and associated code information for all such products with which the device is to be used.

The preferred embodiment of the method of the invention, in which the products to be tracked are identified by UPC barcodes and the device includes a barcode scanner, includes a first sequence of steps referred to as the Data Acquisition Mode, which are performed when units of a product with an expiration date are initially stocked or placed in inventory for sale, and a second sequence of steps referred to as the Management Mode, which are performed to check for the presence of units of product with an approaching expiration date. In the Data Acquisition Mode, the unique product identifying information, in the form of a UPC code or stored in a RFID tag, is scanned or read with the device. The user of the device stocking products is prompted to enter the expiration date associated with units of the product being stocked, and the user manually enters the expiration date, using a date format recognized by the software with which the device is programmed. When the expiration date information is entered the software associates the product identification information and the entered expiration date information and stores the associated data in a database. Because all product units in a case or carton have the same expiration date, entry of expiration date is required only once for all product units being stocked that have the same expiration date. Therefore, the date entry procedure can be accomplished very quickly and easily with only minimal change in the normal stocking routine.

The database is preferably maintained in the device itself, but could be stored in a separate computer system to which the associated data is downloaded from the device, and from which selected data is uploaded to the device for operation in the Management Mode. In a supermarket or other retail outlet in which the inventory includes a relatively large number of different products it is common for a person or group to have responsibility for a certain portion of the total inventory, and it is also common for a scanning device to be assigned to each such person or group for the purpose of gathering product identifying information for the portion of the inventory for which that person or group is responsible. The preferred approach of maintaining associated product identifying information and expiration date information in the device used to acquire it is consistent with that common practice. However, it is within the scope of the invention for such associated product and expiration date information to be transferred from individual devices to a central database and cleared from the internal memory of the device after it is transferred. If that approach is used it would be preferable to segregate the associated product and expiration date information in the same manner in which inventory responsibility is divided, to facilitate later access to and use of the stored data.

In the Management Mode of the method of the invention, the associated product identification information and expiration date information is queried to generate a list of products with product unit expiration dates that match a selected date or fall within a selected date range. A user may then check the listed products to determine whether product units with an expiration date within the selected range remain unsold. If so, appropriate action for dealing with product units approaching their expiration date may be taken. For example, such units be removed from regular stock and offered for sale at a reduced price. If no units of a listed product with expiration dates within the selected range remain in stock the data representing the selected product identification and associated expiration date may be deleted from the database.

As a more detailed description, the method of the invention comprises the follow steps:

Data Acquisition Mode
1. scanning the UPC barcode of one expiration dated product unit of a set of units having the same expiration date;
2. temporarily storing product identification information scanned from the barcode in memory;
3. generating a display identifying the product scanned;
4. generating a query display to prompt input of the expiration date associated with the set of units of the scanned product;
5. entering the expiration date common to all units of the set of units of the scanned product;
6. temporarily storing the entered expiration date in memory;
7. associating the entered expiration date with the stored product identification information;
8. storing the associated expiration date and product identification information in the database for later access;
9. stocking for sale or placing in inventory the product units for which product identification information and expiration date information has been acquired and stored;
10. repeating the foregoing steps for additional unique combinations of products and expiration dates as necessary to acquire and store associated expiration dates and product identification information for all such unique combinations stocked during the data acquisition session.

Management Mode
11. inputting a date to initiate a database query;
12. querying the database for product identification information associated with a date within the date range between the date entered in step 8 and a date X days earlier than the date entered in step 8 (X being a preselected numerical value, e.g., 3);
13. displaying a listing of product identification information for products with an associated expiration date within the selected date range;
14. checking stock or inventory of a listed product to identify the presence or absence of product units with expiration dates within the selected date range;
15. if product units within the selected date range for the listed product are found, taking a predetermined action with regard to such identified product units;
16. if products units within the selected date range for the listed product are not found, deleting from the database the associated product identification information and expiration date data relating to the product units not found;
17. repeating steps 12 through 14 for each remaining listed products until the stock or inventory for each listed product has been checked.

In contrast to the method of the invention, which focuses a user's attention to only those products identified by the method as approaching expiration, the only previously available method of accurately monitoring product expiration dates requires a person or persons to regularly check every product unit of every expiration dated product. That procedure is very labor intensive and time consuming, and either diverts personnel from other tasks or requires additional personnel if it is to be effectively performed. In many instances the procedure may not be effectively performed, with the result that expiration dates are not identified until the date has passed and product units must be discarded. It will be readily appreciated that the savings in time, employment costs, and lost product costs that can be achieved through utilization of the method of the invention greatly outweigh the minimal time needed for the entry of expiration date information.

Increasingly, radio frequency identification (RFID) tags are being used for identification instead of or in addition to UPC barcodes, and the method of the invention is readily adaptable to use with RFID tagged products. In a variation of the method, in step 1 outlined above the device used in conjunction with the method may incorporate a RFID reader instead of, or in addition to, a UPC scanner, and step 1 may comprise reading a RFID tag rather than scanning a UPC code. The method of the invention is not limited to use with any particular product code technology, and is readily adaptable to any newly developed technologies as they are introduced.

In step 4 of the method as outlined above, in the preferred embodiment the entry of an expiration date is performed by manually entering the date through the keypad of the device. However, the particular manner for entering the expiration date is not critical to the invention, and other means of entering the information maybe used. In an alternative embodiment the software for implementing the method of the invention includes a speech recognition module, and expiration date information may be entered verbally, through a microphone, and processed through the speech recognition module. It is preferred in this alternative embodiment that the software be capable of accepting expiration date input through the keypad as well as verbally.

In step 9 above, inputting a date to initiate a search of the database may be performed manually, whenever the user wishes to check inventory for approaching expiration dates. Alternatively, this step may be performed automatically, at regular intervals, such as daily, every other day, etc., by the software programmed into the device. Computer operating systems typically include a date and time function, and the software for implementation of the method of the invention may include instructions to initiate a query of the database at selected intervals. The query initiation instruction may include a provision for delaying the query until the device is idle or has been idle for a selected period of time, so as to avoid interference with use of the device for the acquisition of information.

It is preferred that the product identification information displayed in step 11 be sorted primarily by product identification code and secondarily by expiration date before the information is displayed, so that information relating to all units of the same product is listed together regardless of differences in expiration date. Within each group of product listings the information is then preferably sorted by expiration date, in ascending order with the earliest expiration date listed first.

In another alternative embodiment, product location information maybe entered, associated with the product identification information and expiration date information, and displayed with the product and expiration date information in the management mode. Location information can be entered and managed in various formats, such as isle number, isle number and shelf number, and the like. If desired, the listing of product information, expiration date information, and location information could be sorted primarily by location to increase the inspection efficiency by guiding the user along a sequential inspection route. Location information may be entered in a step prior to entry of expiration date in the data acquisition mode, or following the entry of expiration date. The inclusion of location information could be particularly useful in situations in which units of the same product are displayed for sale in more than one location, and could also increase the efficiency of inspection by new personnel.

It is relatively common for some perishable, expiration dated products to be managed by supplier company personnel instead of or in addition to personnel associated with the facility in which the product inventory is held. For example, inventories of grocery products such as bread, chips, etc. in a grocery store or supermarket are often maintained by product supplier. In a further alternative embodiment of the method of the invention, for use by persons who service different stores, store identification information may be entered in the data acquisition mode, associated with the product identification information and expiration date information, and displayed with the product and expiration date information in the management mode. This alternative embodiment of the method may be used with or without entry of in-store product location information, as described above.

The foregoing description of the preferred embodiment and of alternative embodiments and variations of the method of the invention is intended to be illustrative and not limiting. Further embodiments and variations may be devised by those of skill in the field based upon the foregoing disclosure, and within the scope of the invention as outlined by the following claims.

The invention claimed is:

1. A method of managing expiration dates of products having individual product units with unique product identification information identifying the product, each of the product units having an expiration date, comprising the steps of, recording the product identification information for a first expiration dated product unit of a set of said units having the same product identification information and the same expiration date;

recording said expiration date common to all said units of said set of units having the same expiration date;

associating said expiration date with the said product identification information;

storing said associated expiration date and said product identification information in a database;

stocking for sale or placing in inventory said product units for which said product identification information and said expiration date information has been stored in said database;

repeating the foregoing steps for additional unique combinations of products and expiration dates as necessary to acquire and store associated expiration dates and product identification information for all such unique combinations stocked;

selecting a date for the purpose of initiating a query of said database;

querying said database for product identification information associated with an expiration date within a date range between said selected date and a date a preselected number of days earlier than said selected date;

displaying a listing of said product identification information for products with an associated expiration date within said date range;

checking stock or inventory of a listed product to identify the presence or absence of product units with expiration dates within said date range;

if product units within said date range for said listed product are found, taking a predetermined action with regard to said found product units;

if product units within said date range for said listed product are not found, deleting from said database said associated product identification information and expiration date data relating to said product units not found; and repeating the foregoing three steps for each remaining product of said listed products until the stock or inventory for each said listed product has been checked and appropriate management action taken.

2. The method of claim 1, wherein the steps of recording said product identification information, recording said expiration date, associating said expiration date with the said product identification information, storing said associated expiration date and said product identification information in said database, querying said database, and displaying said information are performed utilizing a programmable electronic device having data entry means, memory, data storage means, and a display means.

3. The method of claim 2, wherein said product identification information is in the form of a machine readable code, and wherein said data entry means of said electronic device includes a code reading means.

4. The method of claim 3, wherein said machine readable code is a bar code, wherein said code reading means is a bar code scanner, and wherein the step of recording said product identification information is performed by scanning said bar code with said bar code scanner and storing said product identification information in said memory of said electronic device.

5. The method of claim 3, wherein said machine readable code is stored in a radio frequency identification tag attached to said units of said products, wherein said code reading means is a radio frequency identification tag reading means, and wherein the step of recording said product identification information is performed by reading said radio frequency identification tag with said reading means and storing said product identification information in said memory of said electronic device.

6. The method of claim 2, wherein said data entry means includes a keypad, and wherein the step of recording said expiration date is performed by manually entering said expiration date through said keypad and storing said expiration date in said memory of said electronic device.

7. The method of claim 2, wherein said data entry means includes a microphone, wherein said electronic device is programmed with voice recognition software, and wherein the step of recording said expiration date is performed by speaking said expiration date into said microphone, converting said spoken expiration date information into digital data, and storing said expiration date in said memory of said electronic device.

8. The method of claim 2, comprising the additional step of generating a display on said display means to prompt the recording of said expiration date, between the step of recording said product identification information and the step of recording said expiration date.

9. The method of claim 2, wherein said database is stored in said data storage means of said electronic device.

10. The method of claim 2, wherein said database is stored in a computer system separate from said electronic device, and comprising the additional step of transmitting said associated expiration date and said product identification information to said computer system, between the step of associating said expiration date with the said product identification information and the step of storing said associated expiration date and said product identification information in a database.

11. The method of claim 2, wherein said data entry means includes a keypad, and wherein the step of selecting a date for the purpose of initiating a query of said database is performed by manually entering said date into said electronic device using said keypad.

12. The method of claim 2, wherein said electronic device includes a calendar function, and wherein the step of selecting a date for the purpose of initiating a query of said database is performed automatically by computer software programmed into said electronic device.

13. The method of claim 1, comprising the additional step of recording product location information before the step of associating said expiration date with the said product identification information, and wherein the step of associating said expiration date with the said product identification information also includes associating said product location information with said product identification information and said expiration date.

14. A method of managing expiration dates of products having individual product units with unique product identification information in the form of a machine readable code identifying the product, each of the product units having an expiration date, using a programmed portable electronic device having a data entry keypad, code reading capability, a display screen, memory, and data storage, comprising the steps of, entering into the data storage of the device product identification information and associated machine readable code information for all products to be managed using the electronic device;

reading the machine readable code of one expiration dated product unit of a set of units having the same expiration date;

temporarily storing in memory said product identification information read from said machine readable code;

generating a display identifying said product associated with said machine readable code;

generating a query display to prompt input of the expiration date associated with the set of units of the scanned product;

entering said expiration date common to all units of said set of units of said product;

temporarily storing said entered expiration date in memory;

associating said entered expiration date with said stored product identification information;

storing said associated expiration date and product identification information in a database;

stocking for sale or placing in inventory said product units for which said product identification information and said product expiration date has been read, entered, associated, and stored;

repeating the foregoing steps for additional unique combinations of products and expiration dates as necessary to acquire and store associated expiration dates and product identification information for all such unique combinations stocked;

selecting and entering a date to initiate a query of said database;

querying said database for product identification information associated with an expiration date within a date range between said selected date and a date a preselected number of days earlier than said selected date;

displaying a listing of said product identification information for products with an associated expiration date within said date range;

checking stock or inventory of a listed product to identify the presence or absence of product units with expiration dates within said date range;

if product units within said date range for said listed product are found, taking a predetermined action with regard to said found product units;

if product units within said date range for said listed product are not found, deleting from said database said associated product identification information and expiration date data relating to said product units not found; and repeating the foregoing three steps for each remaining product of said listed products until the stock or inventory for each listed product has been checked and appropriate management action taken.

15. The method of claim 14, wherein said machine readable code is a UPC bar code printed on each of said units of said products.

16. The method of claim 14, wherein said machine readable code is stored in radio frequency identification tags attached to said units of said products.

17. The method of claim 14, wherein the step of entering said expiration date is performed by entering said expiration date through the data entry keypad of the electronic device.

18. The method of claim 14, wherein the electronic device has a microphone, and wherein the step of entering said expiration date is performed by speaking said expiration date into the microphone.

19. The method of claim 14, comprising the additional step of entering product location information before the step of associating said expiration date with the said product identification information, and wherein the step of associating said expiration date with the said product identification information also includes associating said product location information with said product identification information and said expiration date.

20. The method of claim 19, wherein said product location information includes identification of the facility in which said products are stocked.

* * * * *